United States Patent [19]

Panek et al.

[11] 4,058,671
[45] Nov. 15, 1977

[54] ELECTRICAL PENETRATION ASSEMBLY

[75] Inventors: George J. Panek, Phoenix; Francis H. Ingham, Scottsdale; Albert R. Sedig, Buckeye; Gerald R. Nieman, Phoenix, all of Ariz.

[73] Assignee: International Telephone and Telegraph Corporation, New York, N.Y.

[21] Appl. No.: 565,479

[22] Filed: Apr. 7, 1975

[51] Int. Cl.[2] .................. G21C 13/04; H01B 17/30
[52] U.S. Cl. ............................. 174/151; 174/12 R
[58] Field of Search ............ 174/12 R, 13, 18, 21 CA, 174/99 E, 151, 152 R, 152 GM

[56] References Cited

U.S. PATENT DOCUMENTS 3,780,204 12/1973 Oliver et al. .................. 174/151 X
3,856,983 12/1974 Fisher et al. .................... 174/151

Primary Examiner—Laramie E. Askin
Attorney, Agent, or Firm—A. Donald Stolzy

[57] ABSTRACT

An electrical penetration assembly for a nuclear reactor containment wall in which solid copper conductors are removably mounted into the penetration canister from outside the containment wall. Each conductor is mounted in a feedthrough pipe by glass-sealed headers, one of which has a metal bellows that permits axial expansion of the conductor when it is subjected to elevated temperatures.

7 Claims, 3 Drawing Figures

ELECTRICAL PENETRATION ASSEMBLY

BACKGROUND OF THE INVENTION

The present invention relates generally to an electrical penetration assembly and, more particularly, to a containment electrical penetrator for conducting electrical current from points outside a thick reactor containment wall to points within the containment wall without allowing leakage of gas or fluids through the containment wall.

The rapidly expanding demand for increased electrical energy in a pollution-free atmosphere has required an increase in the construction of nuclear power generating plants. These plants are designed and constructed to anticipate the most severe of nature's adversities. The nuclear power generating plant is built with a thick reactor containment wall, typically five feet thick, such that it is necessary to provide electrical connections from points outside the wall to points within the wall without allowing leakage of gas or fluids through the wall. These electrical connections are for instrumentation, control, and power functions and also include rod position, radiation monitoring, and temperature instrumentation and control as well as power for fuel transfer cooling pumps, valves and recirculating fans.

Normally, the penetration assembly comprises a canister which is mounted within the containment wall and has a number of copper conductors extending therethrough for making electrical connections. To allow for thermal expansion differences between the canister and the copper conductors, copper rod-to-cable crimp or solder joints or sliding pin-socket joints have been necessary within the canister. Joints such as these degrade the electrical current carrying capacity of the penetration assembly, can result in excess heat and may not have the structural strength required to withstand extreme mechanical forces which result during short circuit conditions. Also, normally the conductors are a permanent non-repairable part of the penetration assembly, by virtue of being sealed in the canister end plates with epoxy, glass or ceramic. The canister is normally welded into the containment wall and should a defect occur in any one conductor, the entire penetration must be cut out and replaced, resulting in great expense because of both the cost of the penetration assembly and the length of time required for reactor shut-down. Also, penetration assemblies must be installed from both the outboard and inboard sides of the containment wall which results in the installer working inside the wall for a significant length of time where he is exposed to reactor radiation.

The purpose of the present invention is to overcome the attendant disadvantages of the presently used electrical penetration assemblies by providing an assembly in which the conductors have greater current carrying capacity and greater conductivity, thereby minimizing overheating problems. Also, another purpose of the invention is to provide an electrical penetration assembly in which any individual conductor within the canister may be removed with a minimum of cost and downtime, thus avoiding the necessity of cutting out the entire penetration canister from the containment wall. Further, it is an object of the invention to provide a penetration assembly in which the conductors therein may be replaced from outside the containment wall.

SUMMARY OF THE INVENTION

According to the principal aspect of the present invention, there is provided an electrical penetration assembly for installation in a containment wall comprising a canister which is mounted in an opening extending through the wall. At least one hollow elongated feedthrough pipe extends lengthwise through the canister. An elongated conductor extends longitudinally through the pipe. Means is provided for removably mounting the pipe in the canister so that the conductor therein may be replaced if required. A first glass-sealed header is fixed to one end of the pipe and to one end of the conductor. A second glass-sealed header is fixed to the other end of the pipe and slidably receives the other end of the conductor therein. A flexible bellows surrounds said other end of the conductor. One end of the bellows is connected to said other end of the conductor and the other end of the bellows is connected to the second glass-sealed header so that the bellows will accommodate any longitudinal expansion of the conductor due to elevated temperatures. Since the conductor is free to expand in the feedthrough pipe, the conductor may be a solid copper rod which has high conductivity and thus will prevent overheating and be less subject to structural damage than the conductors utilized in conventional penetration assemblies. Also, because the feedthrough pipe is removably mounted in the canister, the pipe may be removed if the conductor therein becomes damaged, and may be replaced by another pipe having a new conductor therein. Thus, the penetration does not need to be cut out of the containment wall in order to replace one or more of the conductors therein. According to another feature of the invention, the feedthrough pipe is threaded into the canister from the outboard side of the containment wall, so that personnel are not required to work inside the wall exposed to reactor radiation in order to remove a conductor.

Other aspects and advantages of the invention will become more apparent from the following description taken in connection with the accompanying drawings.

DESCRIPTION OF THE PREFERRED EMBODIMENT

Figure 1:
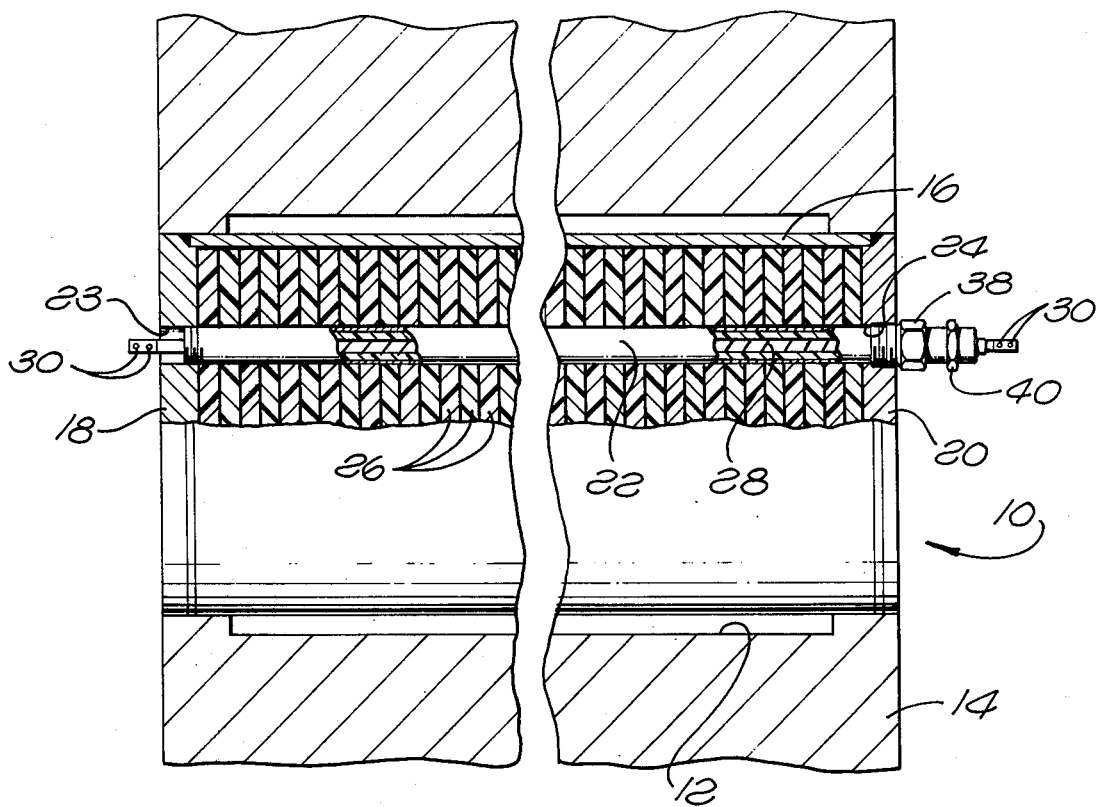
FIG. 1 is a partial sectional view of an electrical penetration assembly mounted in a containment wall.
Figure 2:
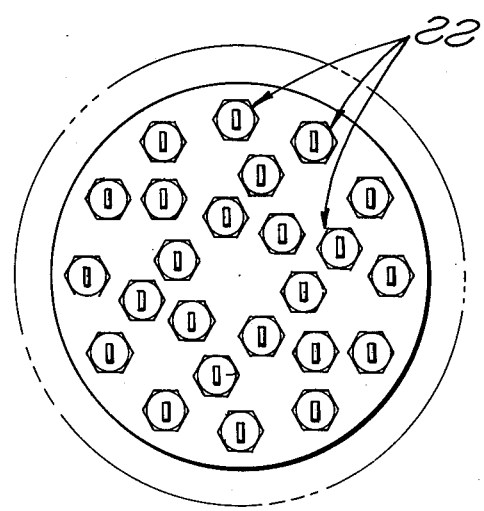
FIG. 2 is an end view of the outboard end of the penetration assembly illustrated in FIG. 1.

Referring now to FIG. 1 of the drawings in detail, there is shown an electrical penetration assembly, generally designated 10, mounted in a passage 12 extending through a containment wall shown somewhat schematically at 14. The penetration assembly is permanently mounted in the containment wall by any suitable means as well known in the art. The penetrator consists of a cannister 16 with end plates 18 and 20 welded to each end. As illustrated in the drawing, the end plate 18 is the inboard end plate and the end plate 20 is the outboard end plate of the canister. That is, the side of the containment wall 14 where the inboard end plate 18 is located is the inside of the nuclear reactor containment while the side of the wall where the end plate 20 is mounted is the outside of the wall. A plurality of hollow elongated feedthrough pipes 22 are mounted in aligned holes 23 and 24 in the end plates 18 and 20, respectively. Twenty-four of such pipes are illustrated in FIG. 2. It will be appreciated that any larger or smaller number of pipes may be mounted in the canister depending upon the requirements of the particular installation. A plurality of plastic discs 26 are mounted in the canister between the end plates having holes therethrough aligned with the holes in the end plates for receiving the feedthrough pipes to provide additional mechanical support for the pipes. A conductor 28 extends lengthwise through each of the feedthrough pipes. The ends of the conductors extend beyond the end plates of the canister and have holes 30 therein for facilitating connection of the conductors to cables or other conductors leading to the equipment on the opposite sides of the containment wall requiring electrical connection. The manner in which the conductor is mounted within the feedthrough pipe will be discussed later.

Figure 3:
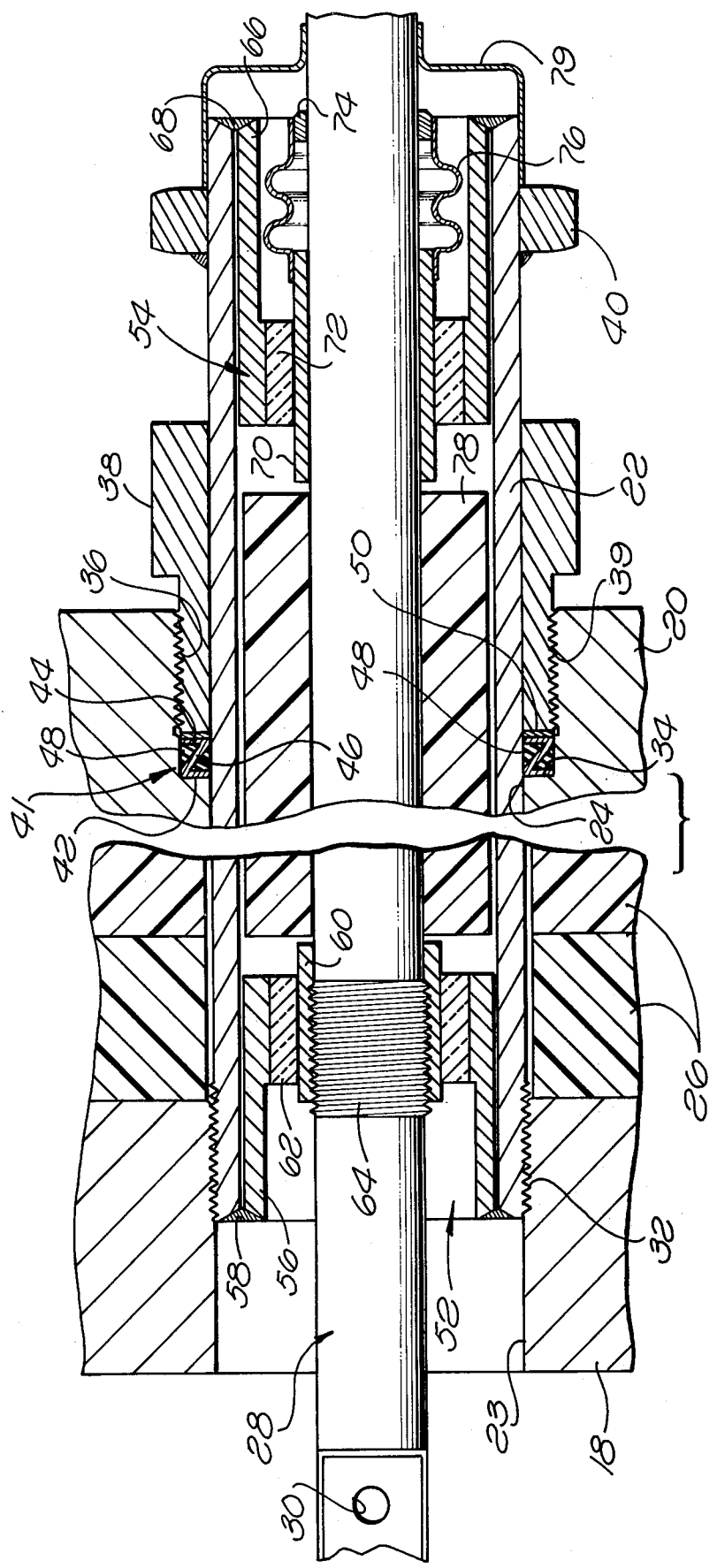
FIG. 3 is an enlarged fragmentary sectional view of the mounting arrangement for one of the conductors in the penetration assembly.

According to one of the features of the invention, each feedthrough pipe 22 is removably mounted in the canister 16. As best seen in FIG. 3, the hole 23 in the inboard end plate 18 of the canister is threaded to accept the threaded end 32 of the feedthrough pipe. The hole 24 in the outboard end plate 20 is formed with a counterbore 34 on the outside which is internally threaded as indicated at 36. A gland nut 38 surrounds the feedthrough pipe and is slidable thereon. The threaded portion 39 of the gland nut threadedly engages in the threaded counterbore 34. A nut 40 fixed to the end of the feedthrough pipe facilitates the threading and unthreading of the feedthrough pipe 22 in the canister.

An annular seal, generally designated 41, is mounted in the bottom of the counterbore 34. Any form of gas and liquid-tight seal may be utilized. The particular seal illustrated in the drawings consists of a pair of annular rings 42 and 44 interconnected by an intermediate inclined section 46 so that the seal has a generally "N" cross-section. An elastomer 48 fills the voids between the rings 42 and 44 and the intermediate section 46 of the seal. In the relaxed condition of the seal 41, the rings 42 and 44 are inclined. When the seal is compressed by the gland nut 38 upon threading of the feedthrough pipe into the canister, the ring sections 42 and 44 of the seal tend to straighten up providing a wiping action with the exterior of the feedthrough pipe and the wall of the counterbore 34. In addition, compressive force against the seal tends to expand the elastomer 48 therein both inwardly and outwardly to produce an additional sealing function. Preferably, a thrust washer 50 is disposed between the seal 41 and the end of the nut 38.

It will be appreciated from the foregoing that the feedthrough pipe may be removed from the outside of the containment wall, minimizing the length of time that personnel would be required to work inside exposed to reactor radiation. If desired, however, a threaded counterbore could be provided in the inboard end plate 18 and a gland nut and seal identical to the nut 38 and seal 41 could be utilized for mounting the inboard end of the feedthrough pipe in the end plate 18 of the canister.

Each conductor 28 is mounted in its respective feedthrough pipe 22 in the canister by an arrangement which allows axial expansion of the conductor when the canister is subjected to high temperatures. As a consequence, the conductor may be formed of a solid copper rod. Such a rod has generally greater conductivity than the cable that is used on each side of the containment wall that is connected to the rod. The increased conductivity of the conductor since it is a solid rod will prevent overheating. Also, the fact that the rod is solid will prevent any structural damage from occurring to the rod. The foregoing mounting arrangement includes a pair of glass-sealed headers, generally designated 52 and 54, at the respective inboard and outboard ends of the conductor. The header 52 comprises a cylindrical shell 56 which is welded at one end to the inboard end of the feedthrough pipe 22, as indicated at 58. The other end of the shell 56 is joined to a metal sleeve 60 by a glass ring seal 62. The sleeve 60 is internally threaded for receiving a threaded section 64 of the conductor 28. Preferably, this threaded joint is soldered to effect a good seal.

The header 54 comprises a metal cylindrical shell 66 which is fixed at its outer end to the end of the pipe 22 by a welded joint indicated at 68. The inner end of the shell 66 is joined to a sleeve 70 by another glass ring seal 72. The sleeve 70 is dimensioned so that the conductor 28 may slide axially therein. A metal collar 74 is either brazed or soldered to the copper rod conductor 28 outside of the sleeve 70. A metal flexible bellows 76 is welded, brazed, or soldered at one end to the sleeve 70 and at its other end to the collar 74. A plastic tube 78 surrounds the conductor 28 within the feedthrough pipe 22 to provide additional mechanical support and insulation between the two parts. Preferably, a metal cap 79 closes the end of the feedthrough pipe and slidably receives the conductor 28 therein.

Thus, the inboard end of the conductor 28 is fixed with respect to the pipe 22 and the outboard end of the conductor is slidable in the sleeve 70 of header 54 so that when the conductor is subjected to elevated temperatures, it is free to axially expand, yet a sealed joint is provided for the header 54 by means of the bellows 76. It is further noted that the shells 56 and 66 of the glass-sealed headers 52 and 54 are spaced slightly from the inner surface of the feedthrough pipe 22. Since each shell is fixed at one end only to the pipe, and the rod 28 is mounted through a glass-sealed joint at the other end of the shell, the shell is free to expand slightly to accommodate any radial expansion of the conductor 28 due to elevated temperatures.

In summary, by the present invention there is provided a novel electrical penetration assembly for a nuclear reactor containment wall in which the conductors may be removed from the canister of the assembly without removing the canister from the wall. In addition, the conductors may be mounted in the penetration assembly from the outboard side of the containment wall to thereby minimize the length of time that personnel would be required to work inside the reactor. The modular design of the penetration assembly of the invention allows replacement of any single conductor with a minimum of cost and down time. Further, by the use of the flexible bellows 76 in the glass-sealed header 54, a solid copper rod may be utilized as the conductor which will minimize problems of overheating and prevent structural damage.

What is claimed is:

1. An electrical penetration assembly for installation in a containment wall comprising:
   a canister adapted to be mounted in an opening extending through the containment wall;
   at least one hollow elongated feedthrough pipe extending lengthwise through said canister;
   means removably mounting said pipe in said canister;

an elongated conductor extending longitudinally through said pipe;

a first glass-sealed header fixed to one end of said pipe and to one end of said conductor;

a second glass-sealed header fixed to the other end of said pipe and slidably receiving therein the other end of said conductor; and a flexible bellows surrounding said other end of said conductor and being connected at one end to said conductor and at its other end to said second glass-sealed header whereby said bellows will accommodate any longitudinal expansion of said conductor due to elevated temperatures.

2. An electrical penetration assembly as set forth in claim 1 wherein:

said conductor is a solid metallic rod.

3. An electrical penetration assembly as set forth in claim 1 wherein:

each said glass-sealed header comprises an outer cylindrical shell surrounding and spaced from an inner cylindrical sleeve with a glass seal therebetween, said shell being fixed to said pipe.

4. An electrical penetration assembly as set forth in claim 3 wherein:

said inner sleeve of said first header is threadedly engaged with said conductor.

5. An electrical penetration assembly as set forth in claim 3 wherein:

said inner sleeve of said second header slidably receives said conductor;

a collar is fixed to said conductor at a position spaced from said sleeve; and said bellows is connected to said sleeve and said collar.

6. An electrical penetration assembly as set forth in claim 3 wherein:

in each said header, said shell is fixed at only one end to said pipe; and said glass seal is located at the other end of said shell, said shell being spaced from the inner wall of said pipe to accommodate any radial expansion of said conductor.

7. An electrical penetration assembly as set forth in claim 1 wherein:

said canister includes an inboard end plate and an outboard end plate;

said one end of said pipe is threadedly engaged in said inboard end plate;

a counterbore is formed in said outboard end plate;

a gland nut is fixed to said pipe and threadedly engages with said counterbore; and sealing means is provided in said counterbore in front of said gland nut.

* * * * *